United States Patent
Lee et al.

(10) Patent No.: US 10,359,301 B2
(45) Date of Patent: Jul. 23, 2019

(54) SIGNAL PROCESSING DEVICE FOR MONITORING STATE OF WIND-POWER TURBINE BLADES AND METHOD THEREOF

(71) Applicant: Korea Electric Power Corporation, Seoul (KR)

(72) Inventors: Jae Kyung Lee, Daejeon (KR); Joon Young Park, Daejeon (KR); Jun Shin Lee, Daejeon (KR); Byung Mok Park, Daejeon (KR); Keum Seok Kang, Daejeon (KR); Moo Sung Ryu, Daejeon (KR); Ji Young Kim, Daejeon (KR); Seok Tae Kim, Daejeon (KR); Dae Soo Lee, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 252 days.

(21) Appl. No.: 14/781,575

(22) PCT Filed: Sep. 27, 2013

(86) PCT No.: PCT/KR2013/008668
§ 371 (c)(1),
(2) Date: Sep. 30, 2015

(87) PCT Pub. No.: WO2015/020263
PCT Pub. Date: Feb. 12, 2015

(65) Prior Publication Data
US 2016/0053748 A1 Feb. 25, 2016

(30) Foreign Application Priority Data

Aug. 5, 2013 (KR) .................... 10-2013-0092345

(51) Int. Cl.
*G01D 5/26* (2006.01)
*G01L 1/24* (2006.01)
(Continued)

(52) U.S. Cl.
CPC ............ *G01D 5/268* (2013.01); *F03D 7/02* (2013.01); *F03D 17/00* (2016.05); *G01L 1/242* (2013.01);
(Continued)

(58) Field of Classification Search
CPC ......... G01D 5/268; G21C 17/00; G06F 11/30; G06F 11/3409; G06F 11/3447;
(Continued)

(56) References Cited

U.S. PATENT DOCUMENTS

| 7,521,083 B2 | 4/2009 | Teichert |
| 2010/0011862 A1 | 1/2010 | Kuhlmeier |

(Continued)

FOREIGN PATENT DOCUMENTS

| KP | 10-1104127 B1 | 1/2012 |
| KR | 10-0760510 B1 | 9/2007 |

(Continued)

OTHER PUBLICATIONS

Korean Office Action issued in corresponding Korean Patent Application No. 10-2013-0092345, dated Jun. 27, 2014, 3 pages.

(Continued)

*Primary Examiner* — Timor Karimy
(74) *Attorney, Agent, or Firm* — Morgan, Lewis & Bockius LLP

(57) ABSTRACT

The present invention relates to a signal processing device for monitoring states of wind-power turbine blades and a method thereof, the signal processing device comprising: an optical fiber sensor unit for sensing moment of rotation of three blades so as to output the moment of rotation as blade (Continued)

signals; a signal transformation unit for converting three blade signals into two fore-ape signals; a rotation information input unit for sensing rotation information of the blades; a rotation speed estimation unit for estimating a rotation speed of the blades on the basis of the rotation information; a state determination unit which removes rotation components from the fore-ape signals and determines whether an operation of a blade is abnormal; and an output unit for outputting the determination result. According to the present invention, two fore-ape signals which are simpler than three blade signals can be processed such that an efficient signal analysis is enabled and the efficiency of determining a state of blades is improved, thereby efficiently managing and maintaining the blades.

5 Claims, 6 Drawing Sheets

(51) Int. Cl.
G01P 3/00 (2006.01)
G01P 3/36 (2006.01)
G01P 3/44 (2006.01)
F03D 17/00 (2016.01)
F03D 7/02 (2006.01)

(52) U.S. Cl.
CPC .............. G01P 3/00 (2013.01); G01P 3/36 (2013.01); G01P 3/44 (2013.01); *F05B 2260/80* (2013.01); *F05B 2270/326* (2013.01); *F05B 2270/327* (2013.01); *F05B 2270/331* (2013.01); *Y02E 10/723* (2013.01)

(58) Field of Classification Search
CPC .... G06F 2201/88; G06Q 10/06; G05B 23/02; F03D 11/0091; F03D 17/00; F03D 7/02; Y02E 10/723; G01L 1/242; G01P 3/00; G01P 3/36; G01P 3/44; F05B 2270/326; F05B 2270/327; F05B 2270/331
USPC ......................................................... 702/182
See application file for complete search history.

(56) References Cited

U.S. PATENT DOCUMENTS

| | | |
|---|---|---|
| 2010/0090463 A1 | 4/2010 | Nies et al. |
| 2010/0132137 A1 | 6/2010 | Eggleston |
| 2010/0329415 A1 | 12/2010 | Stiesdal et al. |
| 2011/0090110 A1 | 4/2011 | Tralshawala et al. |
| 2011/0138937 A1 | 6/2011 | Fritz |
| 2012/0045330 A1* | 2/2012 | Wu .................. F03D 7/042 416/1 |

FOREIGN PATENT DOCUMENTS

| | | |
|---|---|---|
| KR | 10-2011-0110735 A | 10/2011 |
| KR | 10-1155044 B1 | 6/2012 |
| KR | 10-2012-0097395 A | 9/2012 |
| KR | 10-2012-0103512 A | 9/2012 |
| KR | 10-2012-0104821 A | 9/2012 |
| KR | 10-1250206 B1 | 4/2013 |
| KR | 10-1271618 B1 | 6/2013 |

OTHER PUBLICATIONS

International Search Report mailed in corresponding International Patent Application No. PCT/KR2013/008668, dated Apr. 7, 2014; 4 pages.

* cited by examiner

SIGNAL PROCESSING DEVICE FOR MONITORING STATE OF WIND-POWER TURBINE BLADES AND METHOD THEREOF

RELATED APPLICATIONS

This application is the U.S. National Phase under 35 U.S.C. § 371 of International Patent Application No. PCT/KR2013/008668, filed on Sep. 27, 2013, which in turn claims the benefit of Korean Application No. 10-2013-0092345, filed on Aug. 5, 2015, the disclosures of which Applications are incorporated by reference herein.

TECHNICAL FIELD

The present invention relates to a signal processing device for monitoring states of wind turbine blades and a method thereof, and more particularly, to a signal processing device for monitoring states of wind turbine blades, which enables efficient signal analysis for determining a blade state by transforming a blade signal detected from each of three blades in operation into two fore-ape signals, and a method thereof.

BACKGROUND ART

Generally, a wind-power generation system refers to a system for generating electric energy by converting dynamic energy into mechanical energy through rotation of blades using aerodynamic characteristics of dynamic energy of air flow, and driving a generator with the mechanical energy.

Such a wind power generation system is classified into a horizontal type and a vertical type according to a direction of a rotational axis with respect to the ground, and includes a rotor composed of blades and a hub, a generator for producing electricity, a gear box for driving the generator through increase of rotational speed, a cooling/heating system for suitably regulating operation temperature of each component, and a power control system for controlling output power.

Particularly, a horizontal axis wind-power generator turbine, which includes three blades arranged at intervals of 120° with respect to each other and rotated about a rotational axis disposed in a horizontal direction with respect to the ground, is generally used in the art.

Since fracture of the blades results in a long period of shutdown and high replacement costs and, particularly, marine wind power generation causes frequent contamination of the blades due to salinity or dust, the blades need to be monitored in real time.

Thus, although the blades are provided with sensors for monitoring the blades, it is necessary to process signals generated proportional to the number of blades in order to determine the states of the blades based on the signals sent from the sensors. That is, for the horizontal-axis wind power generator turbine including three blades, it is necessary to process three signals obtained from the three blades.

One example of the related art is disclosed in Korean Patent Publication No. 10-2011-0110735A (Publication date: 2011.10.07, entitled "Apparatus for monitoring wind-power generator").

DISCLOSURE

Technical Problem

The present invention is aimed at providing a signal processing device for monitoring states of wind turbine blades, which enables efficient management and maintenance of blades in a horizontal-axis wind power generator turbine including three blades through efficient determination of states of the blades by transforming three blade signals respectively detected from three blades into two fore-ape signals, and a method thereof.

Technical Solution

In accordance with an aspect of the present invention, a signal processing device for monitoring states of wind turbine blades includes: an optical fiber sensor unit measuring wind load moments exerted on first to third blades and outputting first to third blade signals corresponding to the measured wind load moments; a signal transformation unit transforming the first to third blade signals into first and second fore-ape signals representing two orthogonal moments; a rotation information input unit calculating and outputting rotation information indicating a physical location of at least one of the first to third blades; a rotation speed estimation unit estimating a rotation angular velocity of the blades based on the rotation information sent from the rotation information input unit; a state determination unit determining whether operation of the first to third blades is abnormal based on first and second transformation signals obtained by removing rotation components corresponding to the estimated rotation angular velocity from the first and second fore-ape signals; and an output unit outputting a determination result as to normality or abnormality of the operation of the first to third blades.

The first fore-ape signal may represent a component acting on a contact point at a distal end of the first blade in a direction tangential to a circumference drawn by the distal end of the first blade among the wind load moments exerted on the first to third blades, and the second fore-ape signal may represent a component acting on an intersection point between an axis rotated from the first blade by 90° and the circumference in the direction tangential to the circumference among the wind load moments exerted on the first to third blades.

The signal transformation unit may calculate the sum of the first blade signal, a product of the second blade signal and a first constant and a product of the third blade signal and a second constant as the first fore-ape signal, and the difference of a product of the second blade signal and a third constant and a product of the third blade signal and a fourth constant as the second fore-ape signal.

The rotation speed estimation unit may determine a tentative estimation of the rotation angular velocity as the rotation angular velocity of the blades when controlling a difference value between the rotation information and the location of the at least one of the first to third blades calculated from the tentative estimation of the rotation angular velocity to be less than a preset allowable limit through proportional integral control.

The state determination unit may determine that the operation of the blades is abnormal when the first transformation signal or the second transformation signal has a glitch.

The rotation information input unit may detect the rotation information of the blade using the optical fiber sensor unit.

In accordance with another aspect of the present invention, a signal processing method for monitoring states of wind turbine blades includes: measuring, by an optical fiber sensor unit, wind load moments exerted on first to third blades and outputting first to third blade signals corresponding to the measured wind load moments; receiving and transforming, by a signal transformation unit, the first to third blade signals into first and second fore-ape signals representing two orthogonal moments; estimating, by a rotation speed estimation unit, a rotation angular velocity of the blades based on rotation information sent from a rotation information input unit and indicating a physical location of the at least one of the first to third blades; generating, by a state determination unit, first and second transformation signals obtained by removing rotation components corresponding to the estimated rotation angular velocity from the first and second fore-ape signals; determining, by the state determination unit, whether operation of the first to third blades is abnormal based on the first and second transformation signals; and outputting, by an output unit, a determination result as to normality or abnormality of the operation of the blades.

In the signal processing method for monitoring states of wind turbine blades, receiving and transforming the first to third blade signals into the first and second fore-ape signals may include calculating the sum of the first blade signal, a product of the second blade signal and a first constant and a product of the third blade signal and a second constant as the first fore-ape signal, and calculating a difference value between a product of the second blade signal and a third constant and a product of the third blade signal and a fourth constant as the second fore-ape signal.

In the signal processing method for monitoring states of wind turbine blades, estimating the rotation angular velocity may include determining a tentative estimation of the rotation angular velocity as the rotation angular velocity of the blades when a difference value between the rotation information and the location of the at least one of the first to third blades calculated from the tentative estimation of the rotation angular velocity is controlled to be less than a preset allowable limit through proportional integral control.

In the signal processing method for monitoring states of wind turbine blades, in determination of normality or abnormality of operation of the blades, it is determined that the operation of the blades is abnormal when the first transformation signal or the second transformation signal has a glitch.

Advantageous Effects

According to the present invention, the signal processing device can perform efficient signal analysis by processing two fore-ape signals, which are simpler than three blades signals respectively detected from three blades, thereby improving efficiency in determination of states of the blades and thus enabling efficient management and maintenance of the blades.

MODES OF THE INVENTION

Hereinafter, embodiments of the present invention will be described in detail with reference to the accompanying drawings. It should be understood that the drawings are not to precise scale and may be exaggerated in thickness of lines or size of components for descriptive convenience and clarity only. In addition, the terms used herein are defined by taking functions of the present invention into account and can be changed according to user or operator custom or intention. Therefore, definition of the terms should be made according to the overall disclosure set forth herein.

Figure 1:
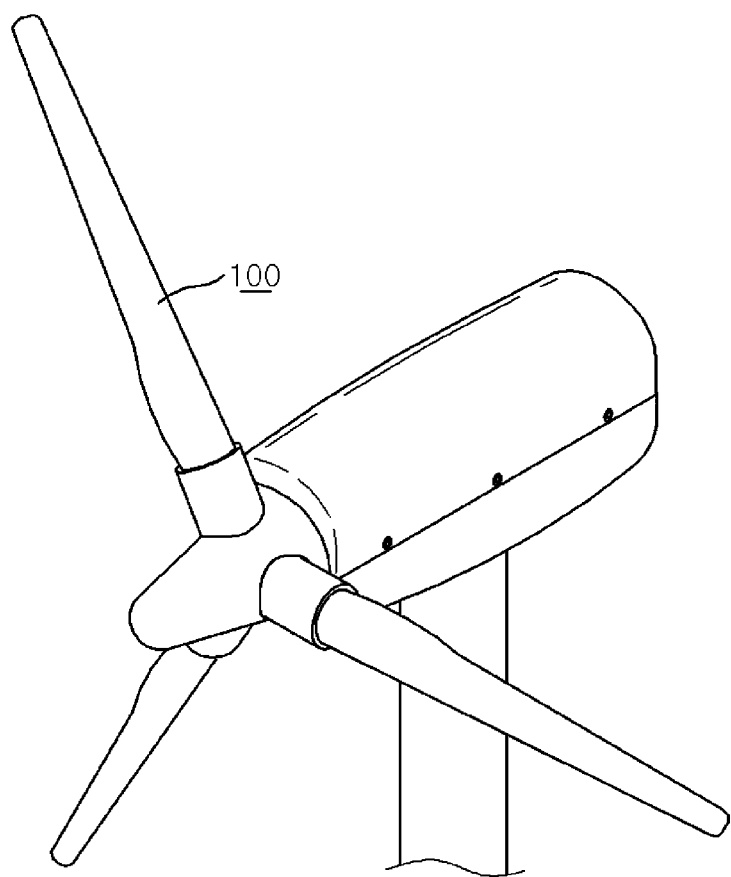
FIG. 1 is a schematic view of a horizontal axis wind turbine having three blades according to one embodiment of the present invention.

FIG. 1 is a schematic view of a horizontal axis wind turbine having three blades according to one embodiment of the present invention.

Referring to FIG. 1, in a horizontal axis wind turbine including three blades, first to third blades are arranged at intervals of 120° in a circumferential direction and rotated about a rotational axis horizontal to the ground by wind power.

In operation of the horizontal axis wind turbine, load applied to each of the first to third blades by wind can be measured by an optical fiber sensor. Such load can be represented by physical quantity, that is, moment. Namely, the load exerted on each blade can be represented by a wind load moment acting on a contact point at a distal end of each blade in a direction tangential to a circumference drawn by the distal end of each blade upon rotation of the blades.

In this case, the wind load moment exerted on each blade can become a vector, in which the direction tangential to the circumference drawn by the distal end of each blade upon rotation of the blades is a direction component thereof.

In addition, since the blades are arranged at intervals of 120° from each other, the wind load moments exerted on the respective blades become vectors, the direction components of which are separated at intervals of 120° from each other.

One of the three blades, that is, a first blade 100, acts as a reference blade in conversion of blade signals B1 to B3 into fore-ape signals F1 and F2.

Figure 2:
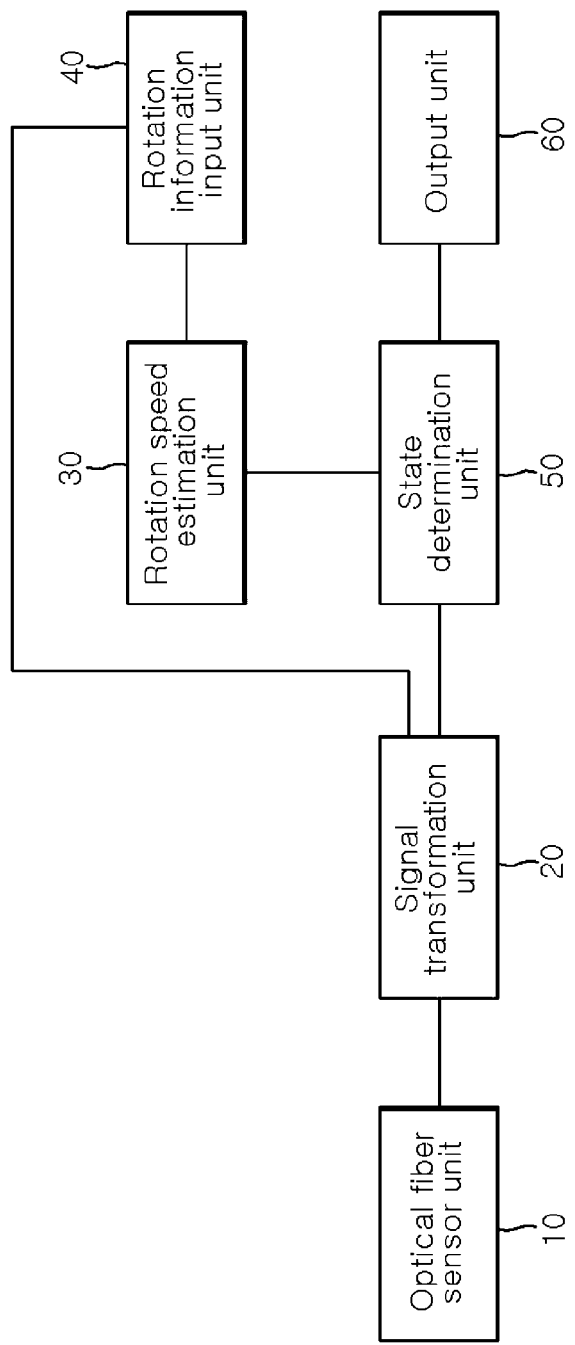
FIG. 2 is a block diagram of a signal processing device for monitoring states of wind turbine blades according to one embodiment of the present invention.

FIG. 2 is a block diagram of a signal processing device for monitoring states of wind turbine blades according to one embodiment of the present invention.

Referring to FIG. 2, a signal processing device for monitoring states of wind turbine blades according to one embodiment of the invention may include an optical fiber sensor unit 10, a signal transformation unit 20, a rotation speed estimation unit 30, a rotation information input unit 40, a state determination unit 50, and an output unit 60.

The optical fiber sensor unit 10 measures a wind load moment exerted on each of the first to third blades and outputs first to third blade signals B1 to B3 corresponding to the measured wind load moments.

The signal transformation unit 20 converts the first to third blade signals B1 to B3 into first and second fore-ape signals F1, F2 representing two orthogonal moments.

Here, the first to third blade signals B1 to B3 correspond to three vectors, direction components of which are arranged at intervals of 120° from each other, whereas the first and second fore-ape signals F1 and F2 correspond to two vectors, direction components of which are orthogonal to each other.

Thus, according to the present invention, whether operation of the blades is abnormal can be determined based on two signals representing two vectors instead of the three signals representing three vectors.

The rotation information input unit 40 calculates rotation information indicating a physical location of at least one of the first to third blades and inputs the calculated rotation information to the rotation speed estimation unit 30.

The rotation information input unit 40 may receive the first and second fore-ape signals F1 and F2 input from the signal transformation unit 20 and calculate the rotation information indicating the physical location of the at least one of the first to third blades.

Alternatively, the rotation information input unit 40 may calculate the rotation information through direct detection of the physical location of the at least one of the first to third blades, or may calculate the rotation information based on a physical quantity detected by an optical fiber sensor included in the optical fiber sensor unit 10.

The rotation speed estimation unit 30 estimates a rotation angular velocity of the wind turbine based on the rotation information input from the rotation information input unit 40.

Here, the rotation speed estimation unit 30 can calculate the location of the at least one of the first to third blades based on a tentative estimation of the rotation angular velocity of the blade.

The location of the at least one of the first to third blades can be calculated through rotation transformation of the location of the at least one of the first to third blades by a rotation angle obtained through integral control of the tentative estimation of the rotation angular velocity.

Then, the rotation speed estimation unit 30 controls a difference value between the rotation information and the location of the at least one of the first to third blades calculated based on the tentative estimation of the rotation angular velocity to be less than a preset allowable limit through proportional integral control while changing the tentative estimation of the rotation angular velocity of the blade.

In some embodiments, the rotation speed estimation unit 30 may determine the tentative estimation of the rotation angular velocity, at which the difference value is less than the preset allowable limit, as the rotation angular velocity of the blade.

The state determination unit 50 may remove rotation components corresponding to the tentative estimation of the rotation angular velocity from the first and second fore-ape signals F1 and F2 to generate first and second transformation signals T1 and T2.

In this case, the state determination unit 50 may employ rotation transformation in order to remove the rotation components from the fore-ape signals F1 and F2. Such rotation transformation can be represented by the following Equation 1.

$$T(\Theta) = \begin{bmatrix} \cos(\Theta) & \sin(\Theta) \\ -\sin(\Theta) & \cos(\Theta) \end{bmatrix}$$ [Equation 1]

$$\Psi_r = T(\Theta)\Psi$$

In this equation, $T(\theta)$ is rotation transformation of rotating given two-dimensional vectors about a rotational axis by an angle of $-\theta$. Accordingly, assuming that a certain blade is rotated at an angular velocity of $\theta$, a vector $\Psi_r$, given by removing a rotation component from a vector $\Psi$ by an angular velocity of $\theta$, can be obtained by rotating the vector $\Psi$ composed of two orthogonal components, that is, the first fore-ape signal F1 and the second fore-ape signal F2, in an opposite direction to the rotating direction of the blade through the rotation transformation $T(\theta)$ each time.

In this way, the two components of the vector $\Psi_r$, which is given by removing the rotation component from the vector $\Psi$, can become the first transformation signal T1 and the second transformation signal T2.

Since the blade is rotated, the first and second fore-ape signals F1 and F2 include both the rotation component of the blade and the wind power moment component exerted on the blade. Here, since the rotation component of the blade is relatively constant during movement of the blade, the first and second transformation signals T1 and T2, from which such a rotation component is removed, may be simple signals exhibiting less variation than the first and second fore-ape signals F1 and F2.

Thus, according to the present invention, the signal processing device can determine whether operation of the blades is abnormal through examination of the first and second transformation signals T1 and T2, which are simpler than the first and second fore-ape signals F1 and F2, thereby improving efficiency in determination of operation abnormality of the blade.

Further, the state determination unit 50 determines whether the operation of the blades is abnormal based on the first and second transformation signals T1 and T2.

For example, the state determination unit 50 may determine that the operation of the blade is abnormal when the first transformation signal T1 or the second transformation signal T2 has a glitch. Such a glitch is an abrupt variation of the signal irrelevant to rotation of the blades.

Thus, the glitch occurring in the first transformation signal T1 or the second transformation signal T2 is highly likely to be an abnormal component irrelevant to normal rotation of the blades or variation in velocity of wind applied to the blades, thereby indicating that the operation of the blades is abnormal.

The output unit 60 outputs determination results as to normality or abnormality of the operation of the blades determined by the state determination unit 50.

Figure 3:
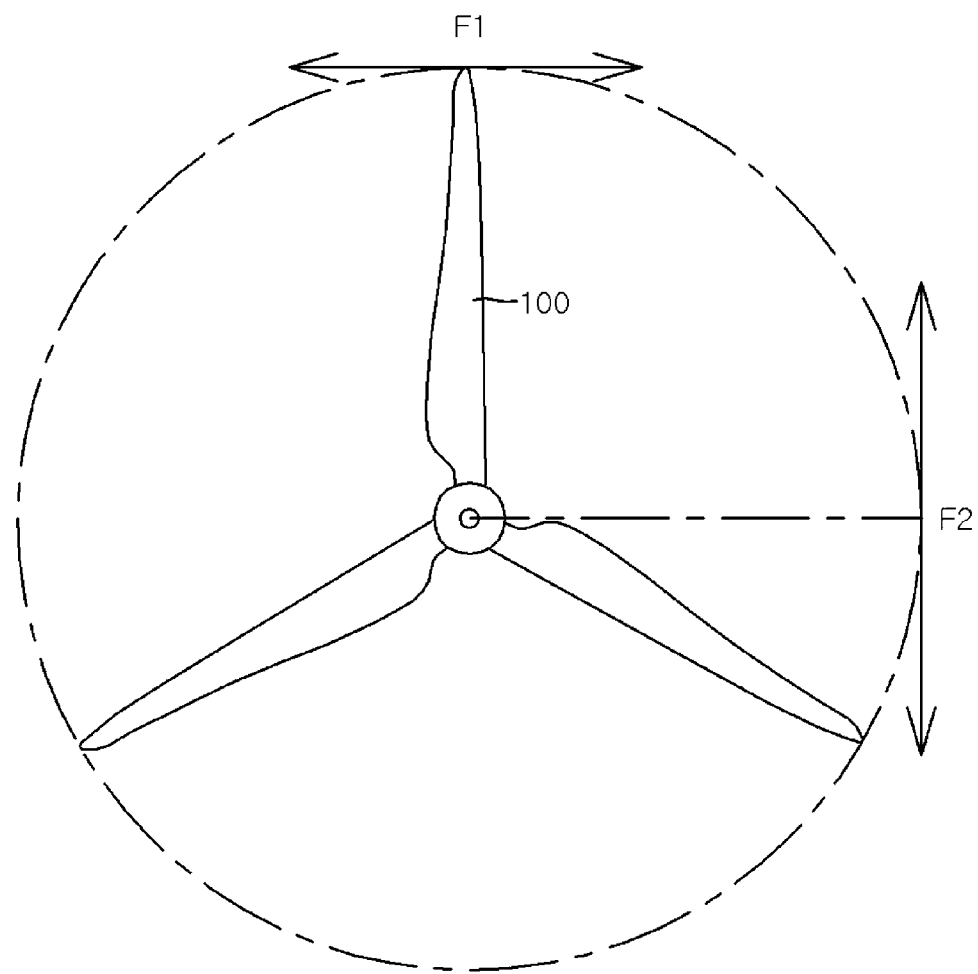
FIG. 3 is a diagram depicting moment components represented by fore-ape signals according to one embodiment of the present invention.

FIG. 3 is a diagram depicting moment components represented by fore-ape signals according to one embodiment of the present invention.

As shown in FIG. 3, in the horizontal axis wind turbine having three blades, the first to third blades are arranged at intervals of 120° from each other on a circumference.

In this embodiment, first to third blade signals B1 to B3 represent wind power moments exerted on the blades, respectively, and the wind power moment exerted on each of the blades can be represented by a vector acting on a contact point at a distal end of each blade in a direction tangential to a circumference drawn by the distal end of each blade upon rotation of the blade.

On the other hand, the first fore-ape signal F1 obtained through transformation of the first to third blade signals B1 to B3 by the signal transformation unit 30 may represent a component acting on a contact point at a distal end of the first blade in a direction tangential to a circumference drawn by the distal end of the first blade among the wind load moments exerted on the first to third blades. Further, the second fore-ape signal F2 may represent a component acting on an intersection point between an axis rotated from the first blade by 90° and the circumference in the direction tangential to the circumference among the wind load moments exerted on the first to third blades.

The first fore-ape signal F1 and the second fore-ape signal F2 can become vectors having directional components as shown in FIG. 3. That is, the first fore-ape signal F1 and the first blade signal B1 may be vectors having the same direction component, and the second fore-ape signal F2 and the first blade signal B1 may be vectors having direction components orthogonal to each other.

Accordingly, the first fore-ape signal F1 includes all components of the first blade signal B1, whereas the second fore-ape signal F2 does not include the components of the first blade signal B1.

Thus, the first and second fore-ape signals F1 and F2 can be obtained from the first to third blade signals B1 to B3 by the following Equation 2.

$$\Psi_a = \Psi_1 + a\Psi_2 b\Psi_3$$

$$\Psi_b = c\Psi_2 - d\Psi_3 \qquad \text{Equation 2}$$

In Equation 2, $\Psi_1$ indicates the first blade signal B1, $\Psi_2$ indicates the second blade signal B2, and $\Psi_3$ indicates a third blade signal B3. In addition, $\Psi_a$ indicates the first fore-ape signal F1 and $\Psi_b$ indicates the second fore-ape signal F2. a, b, c, and d are constants, respectively.

That is, the signal transformation unit 20 calculates the sum of the first blade signal B1, a product of the second blade signal B2 and a first constant (a) and a product of the third blade signal B3 and a second constant (b) as the first fore-ape signal F1, and a difference value between a product of the second blade signal B2 and a third constant (c) and a product of the third blade signal B3 and a fourth constant (d) as the second fore-ape signal F2.

Figure 4:
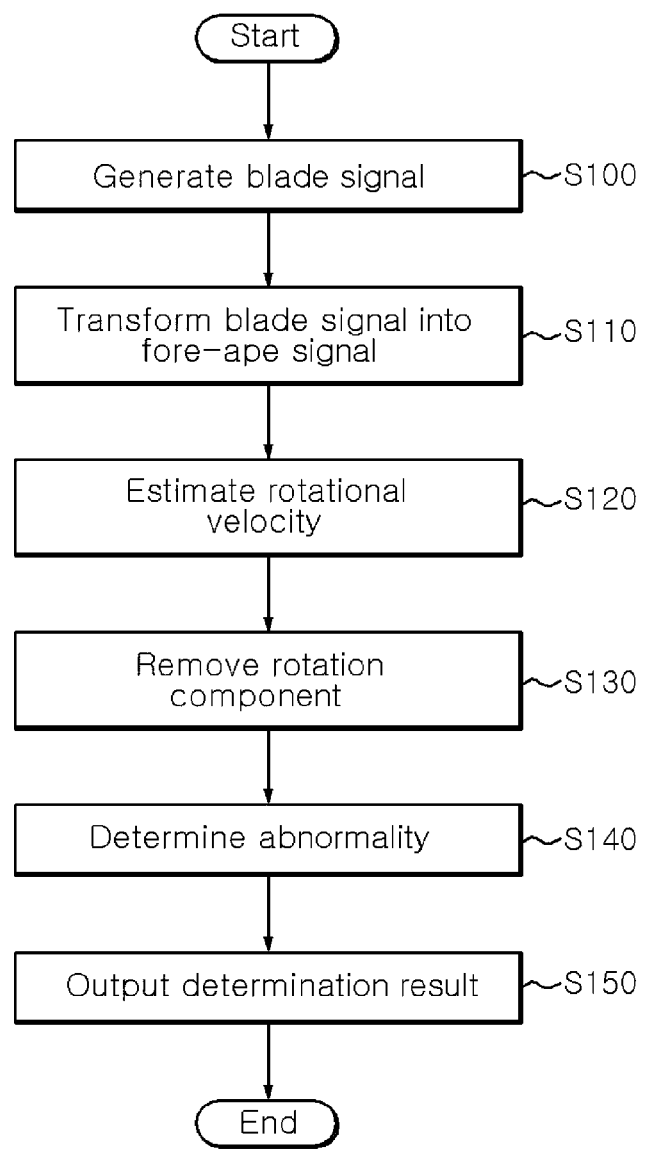
FIG. 4 is a flowchart of a signal processing method for monitoring states of wind turbine blades according to one embodiment of the present invention.

FIG. 4 is a flowchart of a signal processing method for monitoring states of wind turbine blades according to one embodiment of the present invention.

First, the optical fiber sensor unit 10 measures wind load moments exerted on first to third blades and outputs the measured wind load moments as first to third blade signals B1 to B3, respectively (S100).

Then, signal transformation unit 20 converts the first to third blade signals B1 to B3 into first and second fore-ape signals F1 and F2 (S110).

Here, as in Equation 2, the first fore-ape signal F1 can be calculated from the sum of the first blade signal B1, the product of the second blade signal B2 and the first constant (a) and the product of the third blade signal B3 and the second constant (b), and the second fore-ape signal F2 can be calculated from difference between the product of the second blade signal B2 and the third constant (c) and the product of the third blade signal B3 and the fourth constant (d).

Then, the rotation speed estimation unit 30 estimates a rotation angular velocity of the blades based on rotation information sent from the rotation information input unit 40 (S120).

Herein, the rotation information is information indicating a physical location of at least one of the first to third blades and may be calculated by the rotation information input unit 40 and then input to the rotation speed estimation unit 30.

The rotation speed estimation unit 30 may determine a tentative estimation of the rotation angular velocity as the rotation angular velocity of the blades when controlling a difference value between the rotation information and the location of the at least one of the first to third blades calculated from the tentative estimation of the rotation angular velocity to be less than a preset allowable limit through proportional integral control.

Then, the state determination unit 50 generates first and second transformation signals T1 and T2, from which rotation components corresponding to the rotation velocity estimated from the first and second fore-ape signals F1 and F2 are removed (S130).

When the estimated rotation velocity is represented by an angular velocity θ, the state determination unit 50 may obtain a vector $\Psi_r$, given by removing a rotation component from a vector $\Psi$ by an angular velocity of θ, by rotating the vector $\Psi$ composed of two orthogonal components, that is, the first fore-ape signal F1 and the second fore-ape signal F2, in an opposite direction to the rotating direction of the blade through the rotation transformation T(θ) each time, as in Equation 1. In this case, the two components of the vector $\Psi_r$ can become the first transformation signal T1 and the second transformation signal T2, respectively.

Then, the state determination unit 50 determines abnormality of operation of the blade based on the first and second transformation signals T1 and T2 (S140).

Here, the state determination unit 50 may determine that the operation of the blade is abnormal when there is a glitch in the first transformation signal T1 or the second transformation signal T2.

Then, the output unit 60 outputs the determination result (S150) and finishes the process.

Figure 5:
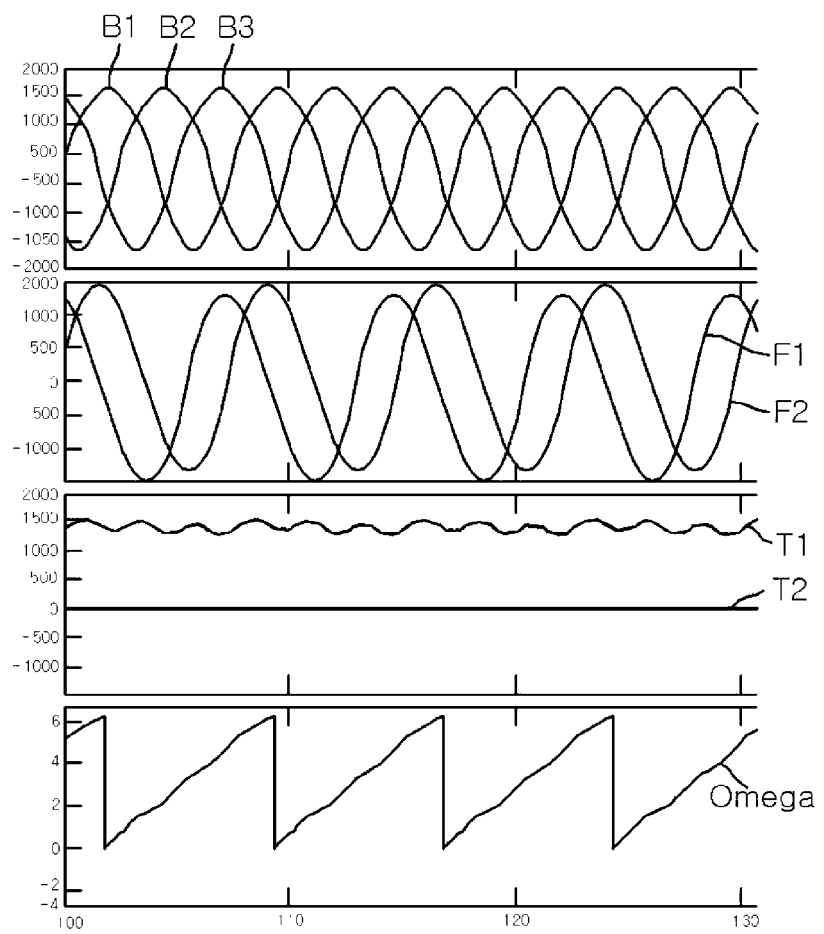
FIG. 5 shows graphs depicting blade signals, fore-ape signals, transformation signals, and rotation components of blades according to one embodiment of the present invention.

FIG. 5 shows graphs depicting blade signals B1 to B3, fore-ape signals F1 and F2, transformation signals T1 and T2, and a rotation component (omega) of blades according to one embodiment of the present invention.

In the first graph from an upper side of FIG. 5, the first to third blade signals B1 to B3 have a phase difference of 120° with respect to each other. In addition, as shown in the second graph from the upper side of FIG. 5, the first and second fore-ape signals F1 and F2 have a phase difference of 90° with respect to each other.

Further, the first blade signal B1 and the first fore-ape signal F1 have the same phase.

In the fourth graph from the upper side of FIG. 5, the rotation component (omega) of the blades is represented by an angle. Here, the rotation component (omega) of the blades is substantially a linear line, which indicates that there is a relatively small variation in rotational velocity of the blades over time.

The third graph from the upper side of FIG. 5 depicts the first and second transformation signal T1 and T2 obtained by controlling the rotation component (omega) of the blades from the first and second fore-ape signals F1 and F2.

Here, it can be seen that the second transformation signal is nearly constant and the first transformation signal exhibits less variation than the fore-ape signals F1 and F2.

Accordingly, normality or abnormality of the operation of the blades can be more efficiently determined by processing the fore-ape signals F1 and F2 exhibiting more variation rather than by processing the first and second transformation signals T1 and T2.

Figure 6:
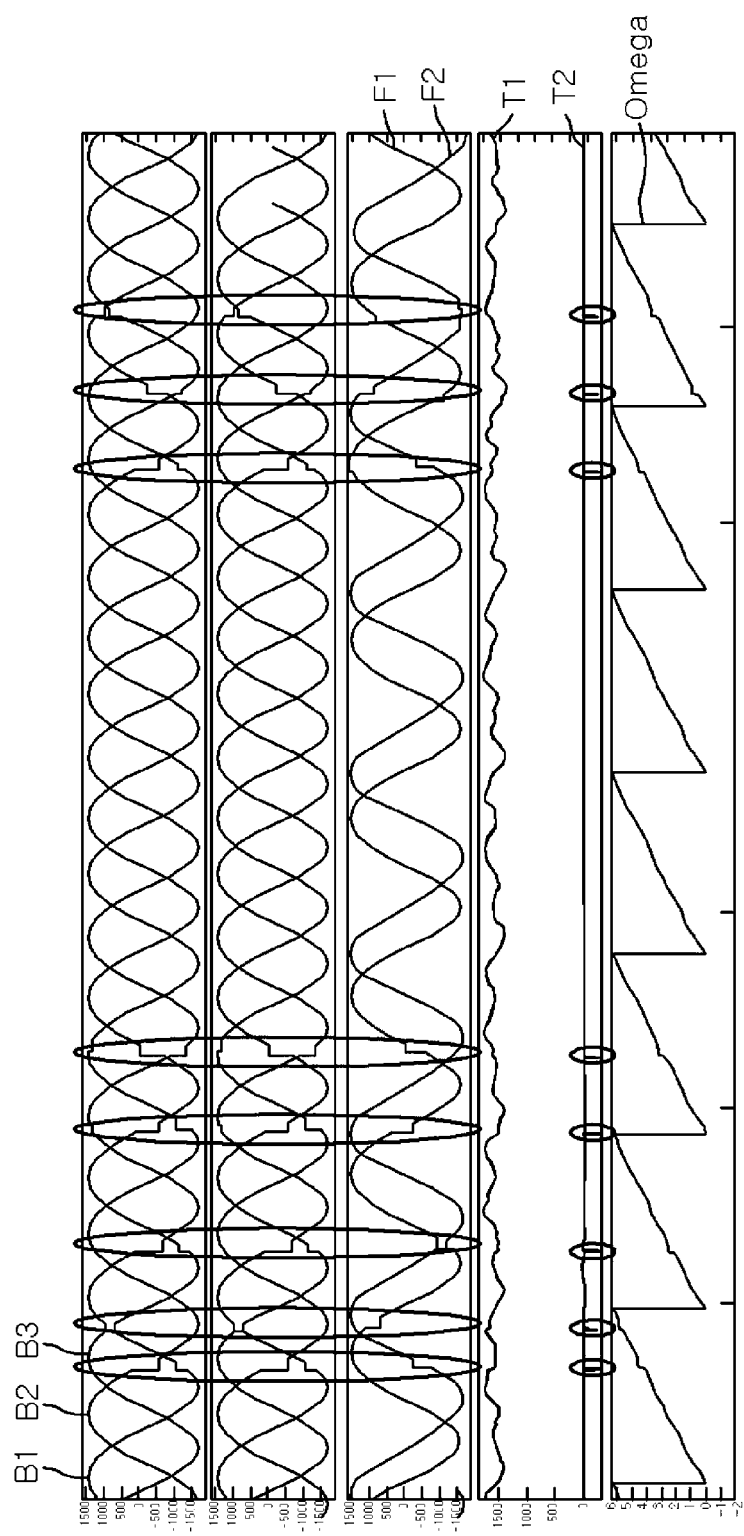
FIG. 6 shows graphs depicting blade signals, fore-ape signals, transformation signals, and rotation components of blades according to one embodiment of the present invention, when it is determined that operation of the blades is abnormal.

FIG. 6 shows graphs depicting blade signals B1 to B3, fore-ape signals F1 and F2, transformation signals T1 and T2, and rotation components (omega) of blades according to one embodiment of the present invention, when it is determined that operation of the blades is abnormal.

In FIG. 6, symptoms of abnormal operation generated in each signal are indicated by an oval.

From an upper side of FIG. 6, the first graph depicts the first to third blade signals B1 to B3, the second graph depicts signals obtained by filtering the first to third blade signals B1 to B3, the third graph depicts the first and second fore-ape signals F1 and F2, the fourth graph depicts the first and second transformation signals T1 and T2, and the fifth graph depicts the rotation component (omega) of the blades.

When it is determined from each signal that abnormal operation occurs, it can be seen that a relatively clear glitch is observed from the transformation signals T1 and T2, whereas it is relatively difficult to determine normality or abnormality in the blade signals B1 to B3 or in the fore-ape signals F1 and F2, as shown by the fourth graph from the upper side of FIG. 6.

In this way, through signal processing by the method according to the present invention, the three blade signals B1 to B3 are transformed into the two fore-ape signals F1 and F2, and the transformation signals T1 and T2 are generated by removing the rotation component (omega) of the blades from the fore-ape signals F1 and F2, thereby enabling more efficient and easy determination as to abnormal operation of the blades.

As such, the signal processing device for monitoring states of wind turbine blades and the method thereof according to the present invention can perform efficient signal analysis by processing the two fore-ape signals F1 and F2, which are simpler than the three blades signals B1 to B3 respectively detected from three blades, thereby improving efficiency in determination of states of the blades. Furthermore, the present invention enables efficient management and maintenance of the blades through more efficient determination of the states of the blades.

Although some embodiments have been disclosed above, it should be understood that these embodiments are given by way of illustration only, and that various modifications, variations, and alterations can be made without departing from the spirit and scope of the present invention. Therefore, the scope of the present invention should be limited only by the accompanying claims.

The invention claimed is:

1. A signal processing device for monitoring states of wind turbine blades, comprising:
   an optical fiber sensor measuring wind load moments exerted on first to third blades and outputting first to third blade signals corresponding to the measured wind load moments;
   a signal transformer transforming the first to third blade signals into first and second vector signals representing two orthogonal moments;
   a processor configured to:
      calculate and output rotation information indicating a physical location of at least one of the first to third blades;
      estimate a rotation angular velocity of the blades based on the rotation information;
      determine whether operation of the first to third blades is abnormal based on first and second transformation signals obtained by removing the estimated rotation angular velocity from the first and second vector signals; and
   an output outputting a determination result as to normality or abnormality of the operation of the first to third blades,
   wherein the first vector signal represents a component acting on a contact point at a distal end of the first blade in a direction tangential to a circumference drawn by the distal end of the first blade among the wind load moments exerted on the first to third blades, and the second vector signal represents a component acting on an intersection point between an axis rotated from the first blade by 90° and the circumference in the direction tangential to the circumference among the wind load moments exerted on the first to third blades,
   the signal transformer calculates the sum of the first blade signal, a product of the second blade signal and a first constant and a product of the third blade signal and a second constant as the first vector signal, and a difference value between a product of the second blade signal and a third constant and a product of the third blade signal and a fourth constant as the second vector signal, and
   wherein the processor determines that the operation of the blades is abnormal when the first transformation signal or the second transformation signal has a glitch.

2. The signal processing device according to claim 1, wherein the processor determines a tentative estimation of the rotation angular velocity as the rotation angular velocity of the blades when controlling a difference value between the rotation information and the location of the at least one of the first to third blades calculated from the tentative estimation of the rotation angular velocity to be less than a preset allowable limit through proportional integral control.

3. The signal processing device according to claim 1, wherein the processor detects the rotation information of the blade using the optical fiber sensor.

4. A signal processing method for monitoring states of wind turbine blades, comprising:
   measuring, by an optical fiber sensor, wind load moments exerted on first to third blades and outputting first to third blade signals corresponding to the measured wind load moments;
   receiving and transforming, by a signal transformer, the first to third blade signals into first and second vector signals representing two orthogonal moments;
   estimating, by a processor, a rotation angular velocity of the blades based on rotation information, and indicating a physical location of the at least one of the first to third blades;
   generating, by the processor, first and second transformation signals obtained by removing the estimated rotation angular velocity from the first and second vector signals;
   determining, by the processor, whether operation of the first to third blades is abnormal based on the first and second transformation signals; and
   outputting, by an output, a determination result as to normality or abnormality of the operation of the blades,
   wherein the first vector signal represents a component acting on a contact point at a distal end of the first blade in a direction tangential to a circumference drawn by the distal end of the first blade among the wind load moments exerted on the first to third blades, and the second vector signal represents a component acting on an intersection point between an axis rotated from the first blade by 90° and the circumference in the direction tangential to the circumference among the wind load moments exerted on the first to third blades,
   wherein receiving and transforming, the first to third blade signals into the first and second vector signal comprises:
      calculating the sum of the first blade signal, a product of the second blade signal and a first constant and a product of the third blade signal and a second constant as the first vector signal; and calculating a difference value between a product of the second blade signal and a third constant and a product of the third blade signal and a fourth constant as the second vector signal, and wherein, in determination of normality or abnormality of operation of the blades, it is determined that the operation of the blades is abnormal when the first transformation signal or the second transformation signal has a glitch.

5. The signal processing method according to claim 4, wherein estimating the rotation angular velocity comprises determining a tentative estimation of the rotation angular velocity as the rotation angular velocity of the blades when a difference value between the rotation information and the location of the at least one of the first to third blades calculated from the tentative estimation of the rotation angular velocity is controlled to be less than a preset allowable limit through proportional integral control.

* * * * *